Patented Oct. 15, 1929

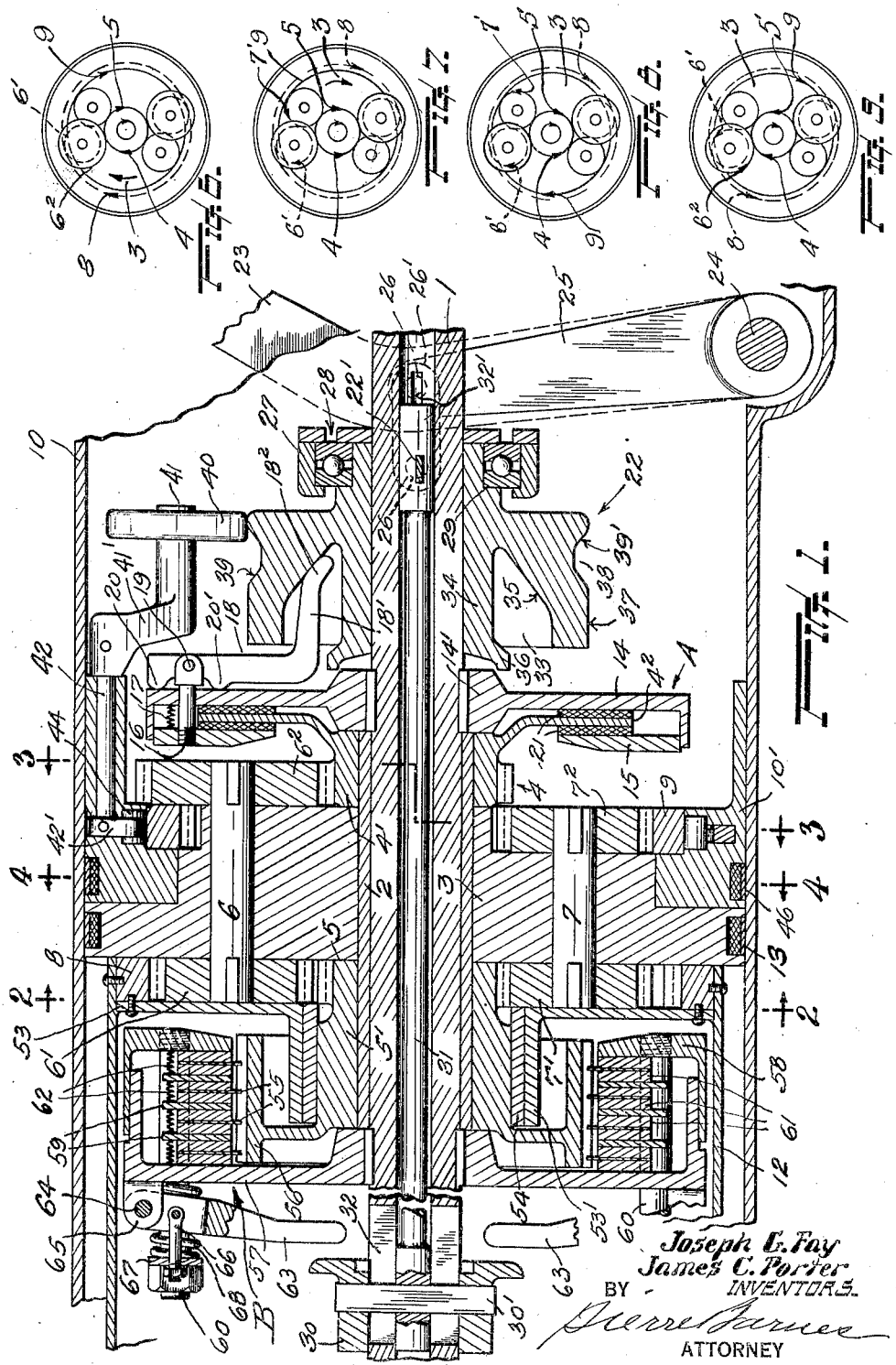

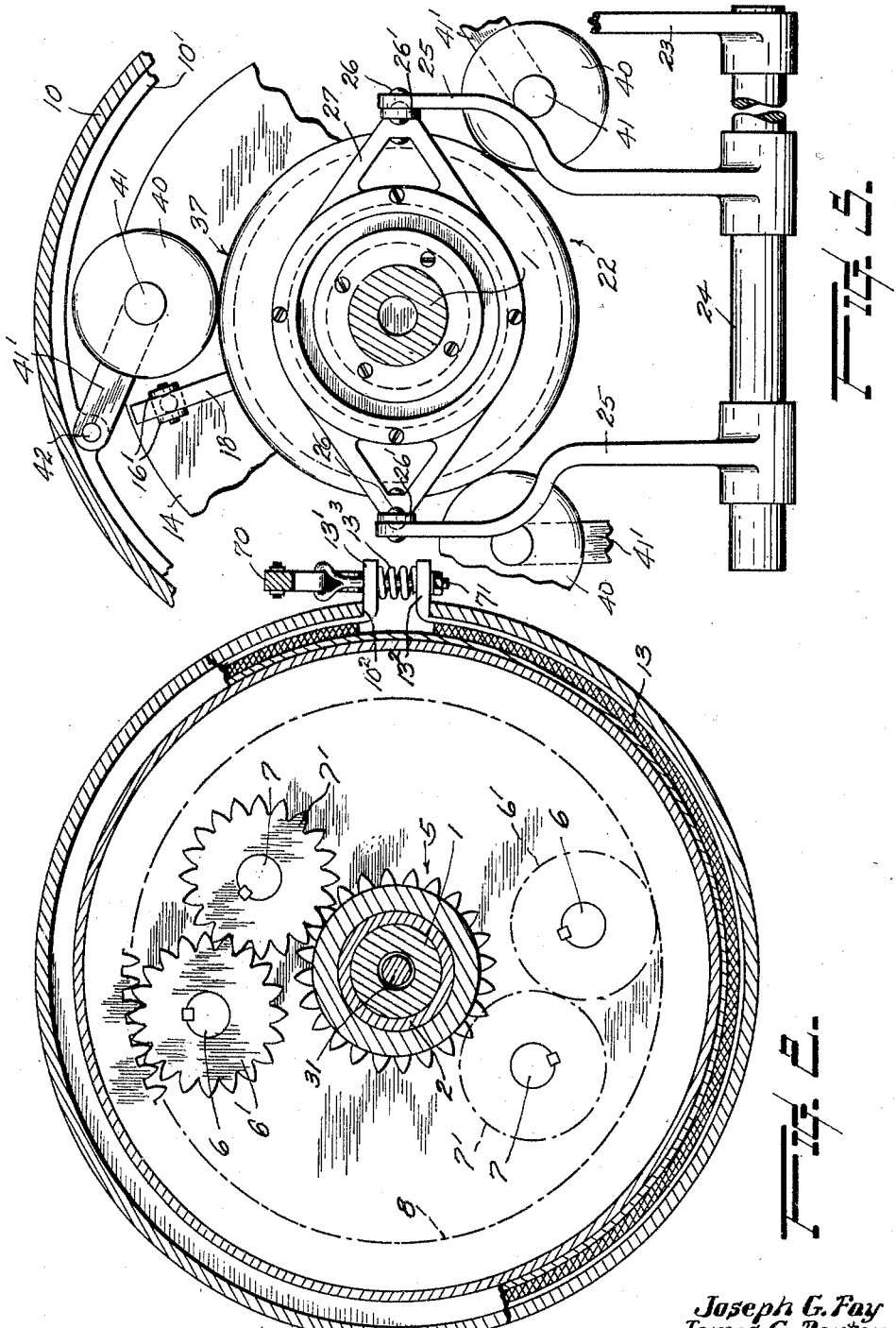

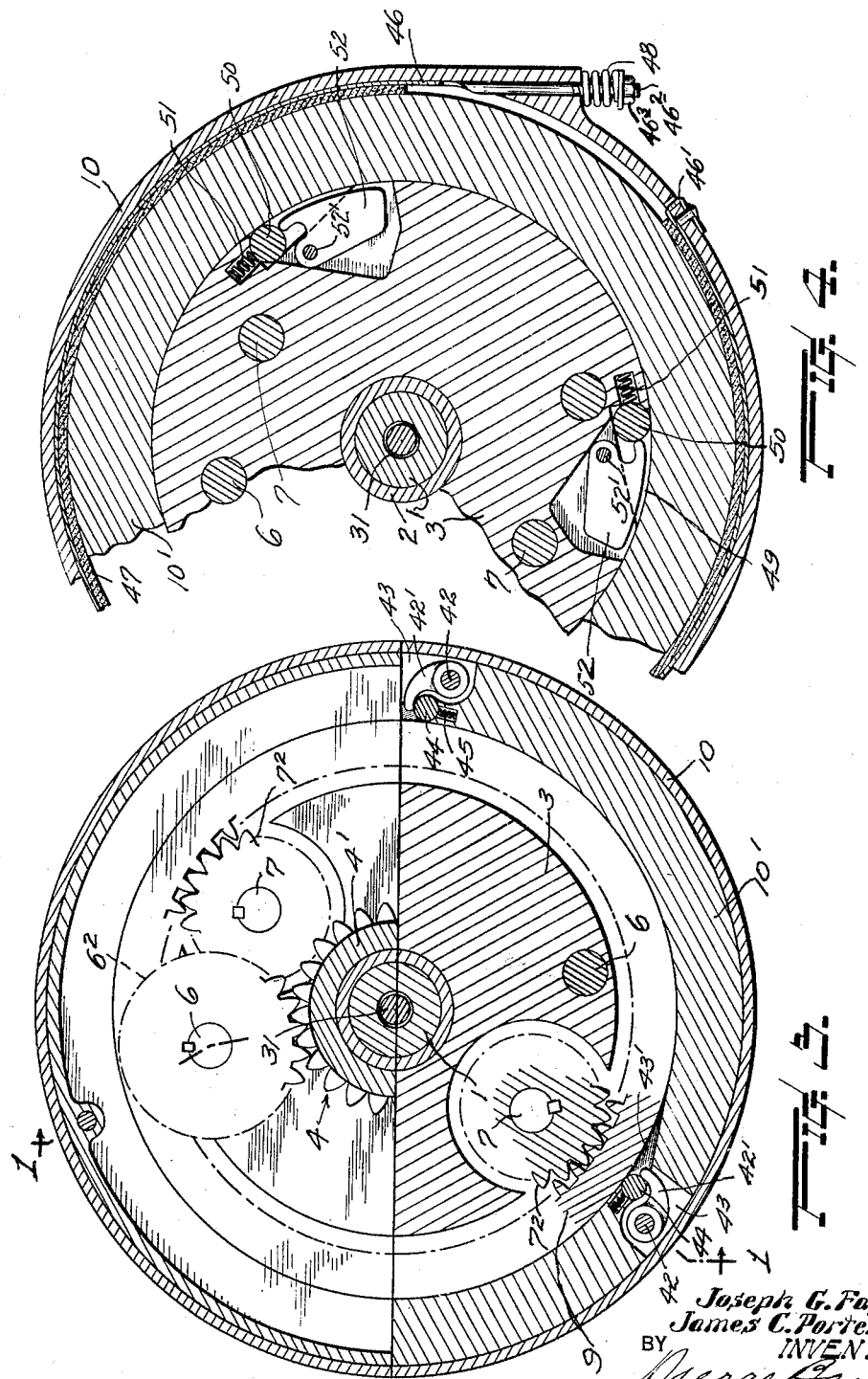

1,731,972

UNITED STATES PATENT OFFICE

JOSEPH G. FAY AND JAMES C. PORTER, OF SEATTLE, WASHINGTON; SAID PORTER ASSIGNOR TO SAID FAY

VARIABLE-SPEED TRANSMISSION

Application filed October 8, 1928. Serial No. 311,164.

This invention relates to variable-speed power transmitting and reversing mechanism adapted, more especially, for use on motor vehicles.

The object of our invention is to simplify and otherwise improve mechanism of this character.

The invention consists in the novel construction, adaptation and combination of parts hereinafter described and claimed.

In the accompanying drawings, illustrating an embodiment of the invention,—

Figure 1 is a longitudinal vertical section taken substantially on broken line 1—1 of Fig. 3; Figs. 2, 3, and 4, are transverse vertical sectional views on lines 2—2, 3—3 and 4—4 of Fig. 1; Fig. 5 is a fragmentary end elevation, partly in section, taken from the right hand end of Fig. 1; and Figs. 6, 7, 8, and 9 are diagrammatic views to illustrate the various gear movements produced by different adjustments of the regulating devices therefor.

In said drawings, the reference numeral 1 represents a tubular shaft constituting the driving member of our transmission, and is driven in one rotary direction as by means of an automobile motor, not shown. Mounted upon said shaft is a sleeve 2 which serves as a bushing for a wheel 3, hereinafter termed the spider, and also for hubs $4^1$ and $5^1$ at the front and rear, respectively, of said spider. Said hubs are provided in their peripheries with spur teeth to serve as pinions, which are denoted by 4 and 5.

Said spider is provided with journal bearings for multiple sets of planetary shafts 6 and 7, two of each set being shown in Fig. 3, arranged parallel with the axis of the power shaft 1.

Rigidly secured to the front and rear ends respectively of the shafts 6 are spur gears $6^2$ and $6^1$, of which the former, $6^2$, are in continuous mesh with the pinions 4; and the gears $6^1$ in continuous mesh with the teeth of an internal gear 8 rigid with a cylindrical rotary drum 12, which constitutes the driven member of the transmission.

Rigidly secured to the front and rear ends respectively of the shafts 7 are spur gears $7^2$ and $7^1$, the gears $7^1$ being in mesh with said pinion 5, and the gears $7^2$ in mesh with the teeth of an internal ring gear 9 mounted for rotation in an annular member $10^1$ which is adapted for rotary movement with respect to the non-rotary housing 10 or which may be secured thereto, as will be presently explained. Provided in the spider 3 is a circumferential groove to accommodate a lined brake-band 13 having ends $13^1$ and $13^2$ (Fig. 2) extending through an aperture in the periphery of the housing 10; the spider-brake above referred to being normally held in its expanded or disengaged relation with respect to said spider by means of a spring $13^3$ acting between the band ends $13^1$ and $13^2$ which protrude from the housing. The function of said brake is to impart reverse movement to the driven member 12 through the medium of the transmission gearing when the spider is prevented from rotating.

To which end, the brake is applied by means of a pedal, or manually, operated lever 70, hereinafter termed the reverse lever, acting through the medium of a draw rod 71 which is attached to the band end $13^2$ to draw the latter toward the band's other end $13^1$ which shoulders, as at $10^2$ against the housing 10.

The hub of the pinion 4 is provided with a disk element $4^2$ which is located between disks 14 and 15 and constitute therewith a clutch, designated generally by A, whereby the pinion may be coupled to the shaft or driving member 1.

As shown in Fig. 1. the disk 15 is in the nature of a ring which is rotatably connected with its companion disk 14 by means of bolts 16 passing through circumferentially spaced apertures of the respective disks; the disk 14 having a hub $14^1$ which is keyed or otherwise secured to the shaft 1 causes the disks 14 and 15 to rotate in unison with such shaft.

Springs 17 interposed between the clutch disks 14 and 15 tend to retain the same in disengaged relation with respect to the disk element $4^2$ of the pinion 4, to enable this pinion to be idle when required.

The clutch bolts 16 are each secured at an end thereof to the disk 15 but are slidable endwise through the companion disk 14. In front of the disk 14, said bolts are bifurcated to receive between the bifurcations $16^1$ thereof, levers 18, which are pivotally connected by means of pins 19 to the respective bolts.

As shown in Fig. 1, a lever 18 is of a substantially elbow shape and arranged to extend radially of the clutch and thence forwardly as at $18^1$, substantially parallel with the axis of the clutch and terminating in a finger $18^2$ disposed in a converging relation with respect to the clutch axis. Each of said levers, furthermore, is characterized by being provided with rearwardly extending spaced protuberances 20 and $20^1$ located at opposite sides of its pivot connection 19 with the respective bolt 16 and are adapted to act against the clutch disk 14 to serve as fulcrums for the associated levers 18 whereby longitudinal movement of the levers in either direction about the inner or outer of said fulcrums 20, $20^1$ will cause the disks 14—15 of the clutch (of which the member 14 is fast to the shaft 1) to be coupled with the disk element $4^2$ of the pinion 4 whereby the latter is made fast to the said shaft.

When the levers 18 occupy positions, corresponding with the one shown in Fig. 1, that is with both protuberances 20 and $20^1$ contacting with the disk 14, the springs 17 serve to retain the members 14 and 15 of the clutch A in their disengaged relation. 21 represent linings of asbestos, or other suitable material, which are advantageously employed between the clutch members 14 and 15 and the disk $4^2$.

For operating the clutch A, we provide upon the shaft 1, a longitudinally shiftable actuator, denoted generally by 22, whose movements are effected by two instrumentalities, one of which is a pedal 23, or an equivalent, connected to a rock shaft 24, having arms 25 (Figs. 1 and 5) whose free ends are connected by pivots 26 and links $26^1$ with a yoke 27 carrying an annular ball bearing assembly 28 engaging in a circumferential groove 29 (Fig. 1) of the actuator. The other of the referred to instrumentalities for effecting movement to said actuator is by means of a speed governor—such, for example, as that illustrated and described in United States Patent No. 1,677,961, issued to Joseph G. Fay, July 24, 1928,—which governor acts through the medium of a shiftable collar 30 mounted upon the shaft 1 to the rear of the transmission (which constitutes the present invention) said collar being secured to the actuator 22 by means of a coupling rod 31 provided within the shaft 1 and is secured to the collar and actuator by keys $30^1$ and $22^1$, respectively, extending through slots 32 and $32^1$ provided therefor in the shaft. Said actuator 22 is of a circular form with an annular recess 33 in one end thereof surrounding a hub element 34. Said hub element extends rearwardly from the conoidal inner surface 35 of the actuator, at one end of said recess, and is provided at its other end with a peripheral ridge 36.

Said conoidal surface 35 or the ridge 36 function to engage the finger elements $18^2$ to cause the levers 18 to effect the engagement of said clutch when the actuator is shifted a requisite distance in either direction longitudinally of the shaft 1.

Said actuator is provided in its outer peripheral surface 37 with a circumferential groove 38 between two oppositely arranged conoidal surfaces 39 and $39^1$. 40 represents wheels, three being shown, adapted to track against the periphery of said actuator, each of said wheels being mounted for rotation on the crank element 41 of an arm $41^1$ of a shaft 42 (Fig. 1) arranged longitudinally of the transmission in a bearing of the annular member $10^1$. Secured to the end of a shaft 42 within a cavity 43 of the member $10^1$ is a finger $42^1$.

The respective cavities 43 communicate with cavities $43^1$ of triangular shape transversely of the member $10^1$ and disposed in the inner periphery thereof.

Provided for the respective cavities $43^1$ are rollers 44 adapted to be pushed thereinto by means of springs 45 for the purpose of securing the internal ring gear 9 to the annular member $10^1$ except when the associated fingers $42^1$ are employed to hold the rollers out of coupling relation with respect to said internal ring gear and the member $10^1$. The roller releasing action of the fingers occurs when the actuator 22 is positioned to permit the wheels 40 of the respective shafts 42 to enter the actuator groove 38 whereupon the power of the springs 45 is asserted to push the rollers 44 into positions to couple the ring gear with the annular member.

When the actuator is shifted to have its outer periphery 37 engage the wheels 40 at one side or the other of said groove the crank connections of the wheels are influenced to cause the fingers $42^1$ to carry the rollers 44 into their inoperative positions with respect to the ring gear 9.

The said annular member $10^1$ is yieldably connected against rotary movement to the housing 10; and, under normal conditions is, in effect, part of the housing. Under excessive stresses, however, as when overcoming the inertia of a load, the member $10^1$ is permitted movement with respect to the housing, and which is accomplished by means which we term a slip brake. Said slip brake, see Figs. 1 and 4, comprises a brake band 46 and a lining 47 therefor, positioned in a circumferential groove of the member $10^1$, one end $46^1$ of the brake band being fastened to the housing 10 and its other end extending as a screw threaded rod $46^2$ through an aperture of the housing for adjustable engagement with a nut 46³, between which and a shoulder on the housing, is provided a helical spring 48.

Means, shown in Fig. 4, are also provided for securing the spider 3 at low speeds of the driving member to the annular member 10¹, such means comprising spaced apart substantially triangular recesses 49 provided in the periphery of the spider to receive rollers 50 adapted to be pushed by springs 51 into engaged relation with the inner periphery of the member 10¹, said springs acting in opposition to heavy bodies 52, one for each roller, said heavy bodies 52 being pivotally connected to the spider at 52¹ so as to provide each of said bodies with an unbalanced portion which at high speeds is affected by centrifugal force to dislodge, in opposition to the respective springs 51, the rollers 50 from their clutching relation with respect to the spider and the annular member 10¹.

53 represents a circular plate secured to the front end of the internal gear 8 and having centrally thereof a hollow boss 53¹ which is journaled upon a bushing 54 which is rotatable upon the hub 5¹ of the pinion 5.

Included in the invention is a second clutch, hereinafter designated by B, whose function is to releasably secure the pinion 5 to the shaft 1 and which is accomplished through the medium of the shiftable collar 30 responsive either to the governor, hereinbefore mentioned, or by means of the controlling pedal 23.

More particularly, the clutch B comprises a plurality of annular clutch disks 55 splined to a cylindrical rim element 56 integral with the hub 5¹ of the pinion 5, said clutch disks being located between telescopically connected clamping elements 57 and 58 of the clutch, of which the element 57 is rigidly secured to the shaft 1.

Located between the successive disks 55 are disks 59 having splined connection with the clutch clamping elements 57 and 58 by the provision in the disks 59 of notches through which extend draw bolts 60 which are rigidly secured to the clutch element 58 and extending loosely through holes (not shown) provided in the complementary clutch element 57. 61 represents layers of asbestos or other suitable material interposed between the various metal disks and the clutching elements of both clutch members.

Springs 62 disposed between the elements 57, 58 and the associated disks 59 tend to separate the individual disk elements of the clutch.

The clutch is adapted to be disengaged through the agency of levers 63, pivotally connected at 64 to lugs 65 of the clutch element 57, acting through the medium of links 66 connecting the respective levers 63 with plates 67 which engage the rear ends of helical springs 68 whose other ends bear against the clutch element 57, the plates 67 being mounted upon the respective bolts.

The levers 63 are engaged by and actuated by a forward movement of the shiftable collar 30 to render the clutch inoperative, the springs 68 functioning to eliminate shock in the coupling of the clutch members.

The action of the transmission devices will be best understood from an inspection of the diagrammatic views Figs. 6, 8 and 9 employing arrow heads indicating the direction of rotation of the various gears.

In third or "high" speed (Fig. 6) both clutches A and B are engaged. All of the toothed gears are interlocked and turn as one, giving a speed ratio of 1 to 1, between the driving and driven members.

In second or "intermediate" speed (Fig. 7) clutch A is disengaged, and the gearing driven through the medium of engaged clutch B; the actuator 22 having been moved rearwardly sufficient to disengage clutch A permitting the wheels 40 to enter the actuator groove 38; the internal gear 9 being coupled with the inner housing 10¹ by means of the rollers 44, causing the spider 3 and associated gear train to track circumferentially about the internal gear 9, through the medium of meshed gears 7² and 9.

In first or "low" speed (Fig. 8) clutch B remains engaged and clutch A disengaged, with the mechanism thus arranged the speed of the driven member is in ratio to that of the gears 5 to 8, see Fig. 2, the spider 3 being locked against rotative movement by the rollers 50 engaging the annular member 10¹ and the spider.

Reverse motion (Fig. 9) is accomplished by disengaging clutch B and engaging clutch A by means of the fingers 18² of the respective levers 18 being actuated through ridge 36 striking the underneath surface.

The meshing of gear 4 with 6², thereupon drives the driven member through the medium of gear 6¹, but in a direction opposite to that of the direct drives as explained above.

The spider 3 is locked against rotation by brake band 13 in reverse.

What we claim, is:—

1. In variable-speed transmission devices, the combination of a driving member, two toothed pinions mounted for rotation on said driving member, a driven member, an internal toothed gear rigid with said driven member, a spider mounted to rotate about the axis of said members, planet-shafts carried by the spider, a toothed-gear ring, means for releasably securing said ring against rotary movement, two sets of planet-gears mounted upon the respective planet-shafts, one set of planet-gears being in continuous mesh with one of said pinions and the internal gear of the driven member, the other set of planet-gears being in continuous mesh with the other of said pinions and said ring-gear, clutch devices for coupling said pinions with said driving member, means for controlling the clutches to effect the actions selectively of the planet-gears whereby motion is transmitted from said driving member to drive the driven member at different speeds and in different directions as desired and means for selectively securing said spider against rotative movement to effectuate directive movement.

2. In devices as defined in claim 1 wherein the clutch controlling means is adapted for regulating the action of the ring securing means.

3. In variable-speed transmission mechanism, the combination of a driving member, a driven member having an internal gear element, two toothed pinions mounted to rotate upon said driving member, clutch devices for the respective pinions, two sets of continuously meshing toothed gears intermediate the internal gear element of said driven member and the pinions of the driving member, a second ring gear releasably secured against rotation, and means for actuating said clutches individually and collectively as desired for transmitting motion from the driving member to the driven member to rotate the latter at different speeds selectively.

4. In variable speed transmission mechanism as defined in claim 3, wherein is employed a spider to carry said two sets of gears as planetary gears about an axis of revolution coinciding with the axis of rotation of the driving member, and means to secure said spider against rotation to transmit reverse motion to the driven member.

5. In variable-speed transmission mechanism, the combination of a driving member, a driven member, two toothed pinions mounted to rotate upon said driving member, clutch devices for releasably securing the respective pinions to said driving member, two sets of continuously meshing toothed gears intermediate said driven member and the pinions of the driving member, and means for actuating said clutches individually and collectively as desired for transmitting motion from the driving member to the driven member to rotate the latter at different speeds selectively.

6. In variable speed transmission devices, the combination with a hollow shaft constituting the driving member of the transmission, a drum constituting the driven member of the transmission, said drum being provided with an internal gear, two toothed pinions mounted for rotary motion upon said shaft, a ring-gear and a spider rotatable about the axis of said shaft, means for controlling the rotation of said ring gear and spider, respectively, two planet shafts carried by said spider, and complementary planet gears mounted upon the respective planet shafts, the gears of one of said planet shafts serving with the latter to make a driving connection between one of said toothed pinions and the internal gear of said drum, the gears mounted upon the other of said planet shafts serving therewith to operatively connect the other of said pinions with said ring-gear, of clutches adapted to normally clutch the respective pinions to said shaft, and means provided within said shaft whereby said clutches selectively are rendered inoperative for regulating the action of transmission devices as to speed and direction of rotation imparted to the driven member.

7. In variable speed transmission devices as defined in claim 6 wherein is employed an actuator adapted to control the operation of said clutches, and means controlled by the longitudinal movement of said actuator for regulating the operation of said ring-gear controlling means.

JAMES C. PORTER.
JOSEPH G. FAY.